March 26, 1935.  L. BONGIOVANNI  1,995,467

REVERSING GEAR FOR FLYING MACHINES

Filed July 13, 1934  2 Sheets-Sheet 1

March 26, 1935.  L. BONGIOVANNI  1,995,467

REVERSING GEAR FOR FLYING MACHINES

Filed July 13, 1934  2 Sheets-Sheet 2

Patented Mar. 26, 1935

1,995,467

UNITED STATES PATENT OFFICE 1,995,467

REVERSING GEAR FOR FLYING MACHINES

Luca Bongiovanni, Turin, Italy

Application July 13, 1934, Serial No. 734,943
In Italy August 11, 1933

5 Claims. (Cl. 74—297)

It is well known that aeroplane accidents generally happen at the landing and more particularly when the airship, which is still under a high forward speed, touches the ground which, with few exceptions, is a more or less uneven field. Brakes have already been applied to the carriage wheels for slowing down the airship on the ground, evidently after the ground has been reached, that is to say after the shock; this arrangement is useful in that it permits of stopping the airship in a small space but it does not lessen at all the risks of landing. Accidents at the landing may be prevented by reducing the speed of the airship just before it reaches the ground, that is one or two seconds in advance, thus hindering that the airship, which is no longer supported, may stop suddenly on the ground or water and collapse.

This invention has for its object a mechanism of light weight and small size which permits of inverting the direction of rotation of the propeller while the engine is running a very short time and by a simple and instinctive operation. The efficiency of the engine unit during normal work is not affected by this arrangement. The reversing gear according to this invention is an epicyclic gearing mechanism comprising two sun wheels and a circular set of planetary wheels.

One of the sun wheels is connected with the driving shaft, the other with the propeller; for instance if the driving shaft and the propeller are coaxial, one of the sun wheels is keyed on the shaft and the other is connected with a sleeve or hollow shaft carrying the propeller. The spider carrying the planetary wheels may be connected with the sun wheel of the driving shaft by means of a clutch device; in this case the whole mechanism rotates in the way of a fly-wheel unit, constituting a resilient joint which adds to the efficiency of the engine, the propeller is directly connected with the engine. Alternately the spider carrying the planetary wheels may be fixed by means of a brake; in this case the planetary wheels work as intermediate gears between the sun wheel of the driving shaft and the sun wheel of the propeller, this latter rotates therefore in the opposite direction to the former effecting the rearward movement of the propeller, that is to say an efficient braking of the airship before it reaches the ground. The pilot operates by means of a lever and by a single operation the clutch device for the forward drive or the brake for the rearward drive; he may also place the mechanism in an intermediate position, in which the mechanism will anyhow remain some instants during the reversing in proximity to the ground or water; according to this invention the ignition of the engine is automatically stopped thus removing the load off the gearing and facilitating the operation; the engine is ready to run again as soon as the ignition is re-established.

The annexed drawings show by way of example the object of the invention.

Figure 1:
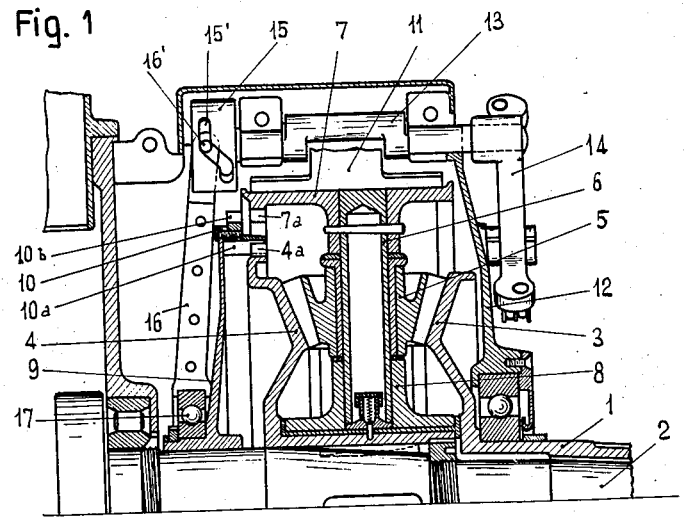
Fig. 1 is an axial section of the upper half of the mechanism, during the rearward drive.

The shaft of the propeller 1 is hollow and concentric to the driving shaft 2, if no reducing gear is used, as in the case illustrated. The shaft 1 will hereinafter be designated as "driven shaft" and the shaft 2 as "driving shaft". The driven shaft 1 is connected with the sun wheel 3, a symmetrically arranged sun wheel 4 is keyed on the driving shaft 2.

The sun wheels mesh with a planetary wheel 5 loosely mounted on the shafts 6 connected with a spider 7. Said shafts are also connected with a sleeve 8 rotating on the hub of the sun wheel 4 for the purpose of reinforcing and stiffening the spider. The wheel 4 is provided with teeth 4a; the spider 7 is also provided with teeth 7a facing the teeth 4a. The hub of a disc 9 is adapted to slide longitudinally on the driving shaft 2; on the periphery of the disc 9 is arranged a ring 10 having inner teeth 10a meshing with the teeth 4a and outer teeth 10b engaging with the teeth 7a.

The teeth 10a and 4a are constantly in engagement, while the teeth 10b engage with the teeth 7a only when the disc is caused to slide towards the wheel 4 (Fig. 2), in which case the sun wheels, the planetary wheels and the disc form a unit, which is set into rotation by the driving shaft in the way of a fly-wheel, that is to say the driven shaft 1 and the driving shaft 2 act as a single shaft. If on the contrary the disc 9 is removed from the wheel 4 until the teeth 10b are disengaged from the teeth 7a, the spider 7 is free and the planetary wheels 5 are free to roll between the wheels 3 and 4; the wheel 4 being keyed on the driving shaft will cause the planetary wheels to roll on the wheel 3 against the resistance of the propeller.

If the disc 9 is further removed from the wheel 4a a brake acting on the spider 7, that is the shafts 6 of the planetary wheels 5, will become automatically operative; the planetary wheels 5 will cease rolling on the wheel 3 and acting as intermediate gearing will transmit the motion in reversed direction from the wheel 4 (Fig. 1) to the wheel 3 effecting thus a rearward movement of the propeller.

Figure 3:
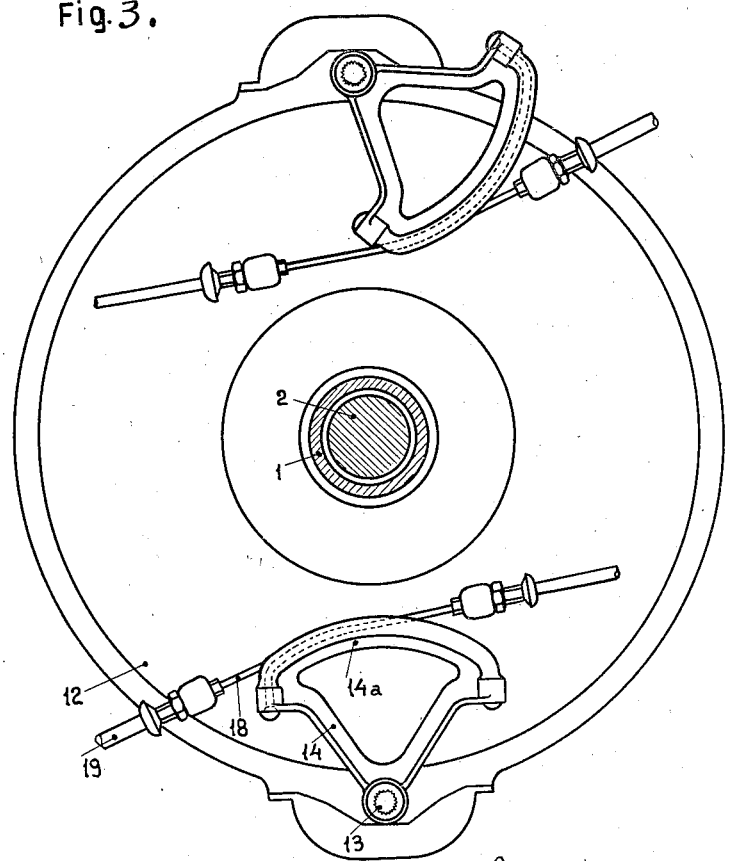
Fig. 3 is a front view, the engine shaft and the propeller shaft being shown in section.
Figure 4:
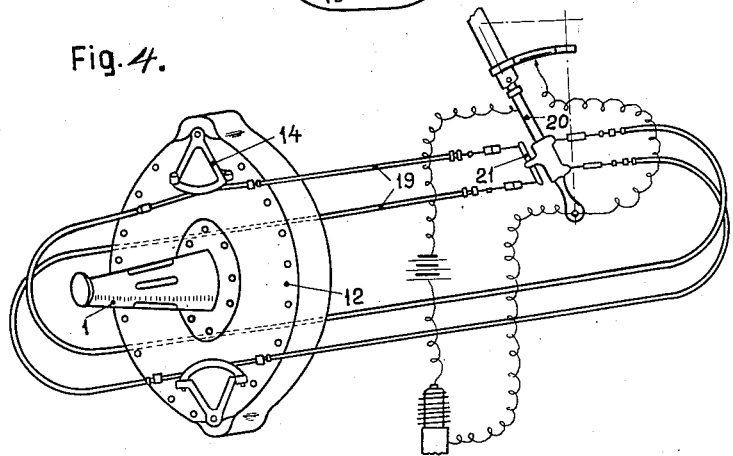
Fig. 4 shows diagrammatically the operating system provided with a flexible transmission.

The brake is constituted by shoes 11 carried by a drum and subjected to the action of a crank pin or eccentric 13. The pins 13 carry on one side operating segment levers 14 (Figs. 3 and 4) to which are anchored the operating cables; on their other side they carry sleeves or caps 15 with slots 15' partially of circular and partially of helical form.

In the slots 15' engage pins 16' of the arms 16 connected with a bearing 17, in which rotates the hub of the disc 9. As long as the pins 16' during rotation of the sleeves 15 and therefore of the pins 13 are in the circular part of the slots 15', the disc 9 will not be axially displaced; as soon as the pins are in the helical part of the slots, the disc 9 is brought towards or removed from the wheel 4, the teeth 10b becoming engaged with or disengaged from the teeth 7a. At the same time the rotation of the pin 13 effected by the lever 14 opens out or closes the shoes 11, the pin being either in the circular, or in the helical part of the slot.

Figure 2:
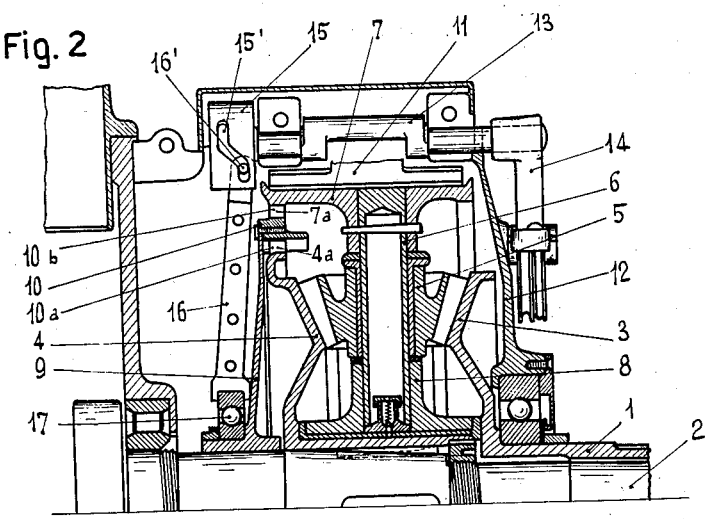
Fig. 2 is an axial section of the same during the forward drive.

It follows that during rotation of the crank pin 13 the brake begins to act (closing or opening the shoes) whereupon, while the brake operation is continued, the clutch 10b—7a is brought into the engagement or disengagement position and finally the brake is applied as shown in Fig. 1, or released as shown in Fig. 2, the slots permitting of taking up the play or wear of the brake packings.

According to the example shown, the brake is operated by means of wires 18 covered by a flexible Bowden tube 19 (Figs. 3 and 4), the ends of which are secured to the segment 14a of the levers 14 and to the drum 12 respectively and the other end is secured to the lever 20 and to one fixed element of the cock pit respectively.

The shoes being displaceable at both ends two wires are used, one end of which abuts against the swinging arm 21 of the control lever 20 for an even distribution of the braking stress.

The pilot operates the control lever 20 in a similar manner as a vehicle brake, passing through the intermediate or loose position. According to this invention this intermediate position of the control lever, by means of an arrangement diagrammatically illustrated on the drawings, breaks the igniting circuit of the engine for the purpose of effecting a momentaneous slowing down of the wheel 4 and therefore of the engine and consequently an easier disengagement of the teeth 4a and 10a. The operation being very quick, the reestablishment of the ignition is sure. By means of rods connected to the lever 20 the pilot controls the backwards movement, the speed of the engine being thereby automatically controlled.

Means are provided for lubricating under pressure the gears and protecting the brake drum against the lubricant. Said means and other constructional details may be varied without departing from the spirit of the invention.

What I claim is:

1. Reversing gear for propellers of flying machines, comprising a driving shaft, a propelling shaft, a sun wheel keyed on said driving shaft, a sun wheel connected with said propelling shaft, planetary wheels meshing with said sun wheels, a spider loosely mounted on said driving shaft and supporting said planetary wheels, clutch teeth on the sun wheel keyed on the driving shaft, clutch teeth on the spider, a movable clutch member mounted on said driving shaft and adapted to engage simultaneously with said clutch teeth on the spider and on the sun wheel, a brake on said spider and means for operating said brake for locking said spider and carry said movable clutch element into the disengaged position.

2. Reversing gear for propellers of flying machines, comprising a driving shaft, a propelling shaft, a sun wheel keyed on said driving shaft, a sun wheel connected with said propelling shaft, planetary wheels meshing with said sun wheels, a spider loosely mounted on said driving shaft and supporting said planetary wheels, clutch teeth on the sun wheel keyed on the driving shaft, clutch teeth on the spider; a movable clutch member loosely mounted on said driving shaft, teeth on said movable clutch member constantly in engagement with the clutch teeth of the sun wheel keyed on the driving shaft, teeth on said movable clutch member adapted to engage with the clutch teeth on said spider, a brake on said spider and means for operating said brake for locking said spider and disengage said movable clutch member from said spider and vice versa.

3. Reversing gear for propellers of flying machines, comprising a driving shaft, a propelling shaft, a sun wheel keyed on said driving shaft, a sun wheel connected with said propelling shaft, planetary wheels meshing with said sun wheels, a spider loosely mounted on said driving shaft and supporting said planetary wheels, clutch teeth on the sun wheel keyed on the driving shaft, clutch teeth on the spider, a movable clutch member loosely mounted on said driving shaft, teeth on said movable clutch member constantly in engagement with the clutch teeth of the sun wheel keyed on the driving shaft, teeth on said movable clutch member adapted to mesh with the clutch teeth on said spider at least one crank pin for operating said brake and a slot and pin coupling between said shaft and said movable clutch member for locking said spider and disengage said movable clutch member from said spider and vice versa.

4. Reversing gear for propellers of flying machines, as claimed in claim 3, in which the slot and pin coupling comprises at least a sleeve connected with said crank pin and having a slotted cam, a pin engaging in said cam and an arm carrying said pin and rotatably mounted but not displaceable on said movable clutch member.

5. Reversing gear for propellers of flying machines, comprising a driving shaft, a propelling shaft, a sun wheel keyed on said driving shaft, a sun wheel connected with said propelling shaft, planetary wheels meshing with said sun wheels, a spider loosely mounted on said driving shaft and supporting said planetary wheels, clutch teeth on the sun wheel keyed on the driving shaft, clutch teeth on the spider, a movable clutch member loosely mounted on said driving shaft, teeth on said movable clutch member constantly in engagement with the clutch teeth of the sun wheel keyed on the driving shaft, teeth on said movable clutch member adapted to mesh with the clutch teeth on said spider, crank shafts for operating said brakes, drums fixed on said shafts and provided with slotted cams, the axis of the initial and final portions of which lie in parallel planes perpendicular to said shaft, while the axis of intermediate portion lies in a plane inclined with respect to the axis of said shaft, pins engaging in said slotted cams and arms carrying said pins and rotatably mounted but not displaceable on said movable clutch member.

LUCA BONGIOVANNI.